United States Patent
Grover (12) United States Patent (10) Patent No.: US 7,654,027 B1
Grover (45) Date of Patent: Feb. 2, 2010

(54) TWIST-LOCK SLING SWIVEL

(75) Inventor: Robert L. Grover, Gladstone, OR (US)

(73) Assignee: Grovtec U S, Inc., Clackamas, OR (US)

( * ) Notice: Subject to any disclaimer, the term of this patent is extended or adjusted under 35 U.S.C. 154(b) by 2 days.

(21) Appl. No.: 12/013,391

(22) Filed: Jan. 11, 2008

Related U.S. Application Data (60) Provisional application No. 60/880,297, filed on Jan. 11, 2007.

(51) Int. Cl.
F41C 23/02 (2006.01)
F16B 21/00 (2006.01)

(52) U.S. Cl. .............. 42/85; 24/573.11; 403/322.2; 411/348

(58) Field of Classification Search ............ 89/36.01, 89/36.02, 36.03, 36.04, 36.07, 36.08, 36.09, 89/36.12, 36.17; 42/188, 304.4, 313.3, 314.2, 42/321.5, 457, 85; 224/150; 24/2.5, 573.11, 24/576.1, 607; 403/33, 322.2; 411/348
See application file for complete search history.

(56) References Cited

U.S. PATENT DOCUMENTS

| | | | |
|---|---|---|---|
| 2,480,662 A | | 8/1949 | McKinzie |
| 2,642,689 A | * | 6/1953 | Cline .............................. 42/85 |
| 2,758,440 A | * | 8/1956 | Magid ............................ 59/95 |
| 2,771,699 A | * | 11/1956 | Herter ............................ 42/85 |
| 3,061,965 A | * | 11/1962 | Lewis ............................ 42/85 |
| 3,066,375 A | * | 12/1962 | Knowles et al. .............. 24/639 |
| 3,226,872 A | * | 1/1966 | Pachmayr ...................... 42/85 |
| 3,861,070 A | * | 1/1975 | Wild et al. ..................... 42/85 |
| 4,198,080 A | | 4/1980 | Carpenter |
| 5,067,267 A | | 11/1991 | Ives |
| 5,394,594 A | | 3/1995 | Duran |
| 5,692,654 A | * | 12/1997 | Bell ........................... 224/150 |
| 6,152,645 A | | 11/2000 | Sanford |
| 6,354,034 B1 | | 3/2002 | Norris, Sr. |
| 6,511,100 B1 | | 1/2003 | Le Clinche |
| 2006/0254113 A1 | * | 11/2006 | Esch .............................. 42/85 |

* cited by examiner

*Primary Examiner*—Bret Hayes
(74) *Attorney, Agent, or Firm*—Stoel Rives LLP

(57) ABSTRACT

An embodiment is a sling swivel that may be removably attached to and detached from a sling swivel base mounted on or within a firearm. More specifically, the sling swivel of an embodiment may be quickly detachable while not substantially prone to inadvertent detachment. An embodiment includes a knob coupled to a spring-biased plunger or actuator, wherein rotating the knob operates the plunger or actuator to removably attach and detach the sling swivel with respect to a sling swivel base.

21 Claims, 6 Drawing Sheets

TWIST-LOCK SLING SWIVEL

RELATED APPLICATION

This application claims the benefit under 35 U.S.C. § 119 (e) of U.S. Provisional Patent Application No. 60/880,297, filed Jan. 11, 2007, which is incorporated herein by reference.

TECHNICAL FIELD

The field of this disclosure relates to sling strap connecting devices and, more particularly, to detachable sling strap swivels of the kind used with firearms.

BACKGROUND

Slings are often included with or used as an accessory to a rifle, shotgun, or any other style of firearm. Generally the sling is attached at one end on or near the forearm or barrel and at the other end to the butt portion of the stock. Each end of the sling attaches to a sling loop that in turn attaches to the firearm with a sling swivel. The sling loop may rotate with respect to sling swivel and to the stock so that the sling loop may remain properly aligned to the direction the sling is pulled.

Slings are a valuable tool for shooters of all types. Among other functions, a sling may be used to tote a gun over a shooter's shoulder. Further, the sling may stabilize the gun as the shooter takes aim. The sling may also be used to carry or drag the shooter and/or their equipment should the shooter be injured or another emergency arise for example in combat. Because sling swivels are used with firearms, the sling swivels should be sturdy enough so that the sling swivel does not break, detach, or otherwise allow the firearm to become disengaged from the sling inadvertently. Nevertheless, it may be desirable that the sling swivel be quickly detachable, so that the sling may be quickly removed from the firearm.

Numerous approaches exist to provide a detachable sling swivel for a firearm. For example, U.S. Pat. No. 2,480,662 to McKinzie describes a sling swivel that may be inserted into and detachably secured to a base. The sling swivel may be removed or detached from the base by operation of a plunger disposed within the body of the sling swivel. As the user merely operates the plunger to remove or detach the sling swivel from its base, the removal or detachment may be quickly completed without tools. However, the plunger may potentially be exposed to inadvertent operation and the sling swivel may detach as a result.

The present inventors have identified a need for an improved sling swivel.

DETAILED DESCRIPTION OF PREFERRED EMBODIMENTS

An embodiment is a sling swivel that may be removably attached to and detached from a sling swivel base mounted on or within a firearm. More specifically, the sling swivel of an embodiment may be quickly detachable while not substantially prone to inadvertent detachment. An embodiment includes a knob coupled to a spring-biased plunger or actuator, wherein rotating the knob operates the plunger or actuator to removably attach and detach the sling swivel with respect to a sling swivel base. In that manner, the sling swivel may remain quickly detachable while decreasing the possibility of inadvertent detachment. Further, the knob may be more easily manipulated to removably attach and detach the sling swivel of an embodiment compared to operating a spring-biased plunger directly.

Figure 1:
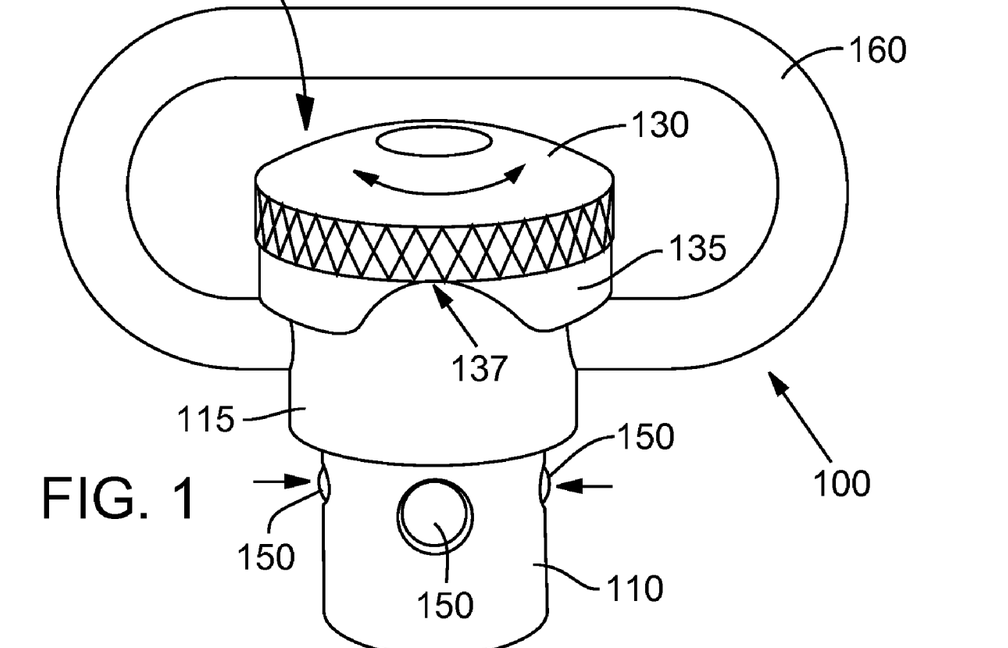
FIG. 1 is a pictorial front view of the sling swivel of an embodiment in an unlocked configuration.

FIG. 1 illustrates a side pictorial view of a sling swivel 100 according to an embodiment. The sling swivel 100 includes a sling loop 160 attached to a body 110 of the sling swivel 100. The sling loop 160 may further couple to a sling or sling strap (not illustrated). In general a firearm includes two mounting points (e.g., sling swivel bases 350 or sling swivel sockets) at substantially opposite longitudinal ends of the firearm so that the sling may extend between two sling loops 160. In an embodiment, the body 110 is a cylindrical plug body and may include an annular shoulder portion 115 at the sling loop 160 end of the body 110 that has a larger diameter than the portion of body 110 or cylindrical plug body that fits within the sling swivel base (e.g., sling swivel base 350 of FIGS. 3-6 or sling swivel socket). The annular shoulder portion 115 may include a pair of transverse openings in substantially direct alignment with each other and extending radially inwardly into or through the annular shoulder 115. In an embodiment, the pair of transverse openings may extend into or through both the annular shoulder 115 and body 110. The transverse openings are adapted to receive and movably secure the sling loop 160 therein, which as noted receives the sling. The sling loop 160 may be a round metal bar that is bent or formed into approximately square oval shape, with ends terminating within the pair of transverse openings in the annular shoulder portion 115 and in an embodiment also the body 110. In an embodiment, the ends of the sling loop 160 extend into the annular shoulder portion 115 and/or body 110 substantially far enough to movably secure the sling loop 160 to the body 110 while not intruding into an axially disposed cavity or bore defined by body 110 to substantially avoid interfering with the operation of a plunger 300 or actuator within the cavity or bore as will be described more fully with reference to FIGS. 3-6. In addition to movably securing the sling loop 160, the annular shoulder portion 115 of body 110 may seat against the sling swivel base 350 or sling swivel socket when the sling swivel 100 (e.g., the body 110 with a smaller diameter than the annular shoulder portion 115) is inserted therein. The seating of the annular shoulder portion 115 of the body 110 controls the insertion depth into the sling swivel base 350 or sling swivel socket and in an embodiment provides spacing between the sling loop 160 and the sling swivel base 350 or sling swivel socket, substantially preventing the sling swivel base 350 or sling swivel socket from interfering with the movement of the sling loop 160.

Figure 2:
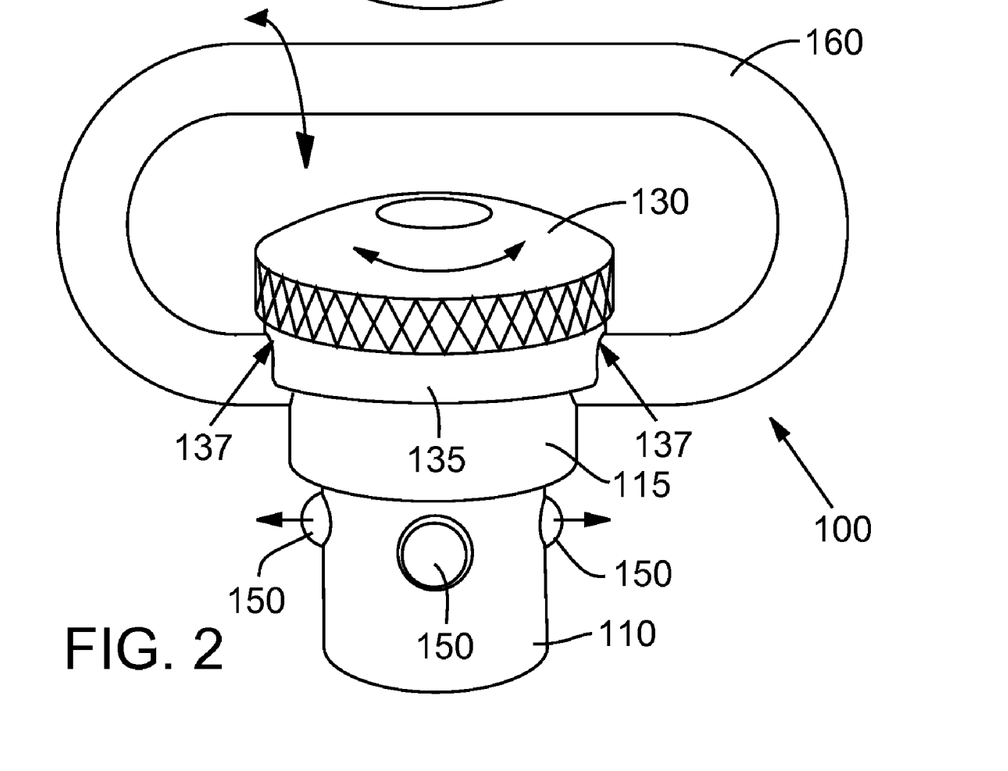
FIG. 2 is a pictorial front view of the sling swivel of FIG. 1 in a locked configuration.

Also formed in the body 110 is a plurality of transversely positioned openings or passages, all of which are positioned in the same plane orthogonal to the longitudinal axis of the body 110. Each opening or passage is adapted to receive a spherical locking member, detent ball, or bearing 150. Said alternatively, the body may define a ball cage for the bearings 150. The outer periphery of each of the openings may be slightly crimped, beaded, or peened to retain the bearings 150 in the openings or passages. Depending on the position of a plunger 300 or actuator within the cavity or bore as will be described in further detail with reference to FIGS. 3-6, the bearings 150 may project beyond the outer surface of the body 110, or may retract within the outer surface of the body 110. For example. FIG. 1 illustrates the bearings 150 retracted within the outer surface of the body and FIG. 2 illustrates the bearings 150 extended beyond the outer surface of the body 110. FIG. 1 may refer to the sling swivel 100 alternatively as the sling swivel 100 in an unlocked configuration in which the sling swivel 100 may be inserted into and removed from the sling swivel base 350 or sling swivel socket 350 that is in turn mounted on a firearm 370. FIG. 2 illustrates the sling swivel 100 in a locked position that detachably secures the sling swivel 100 to the sling swivel base 350 or sling swivel socket once it has been inserted in the sling swivel base 350 or sling swivel socket.

FIGS. 1 and 2 further illustrate that the extension or retraction of the bearings 150 with reference to the outer surface of the body 110 to lock and unlock the sling swivel 100 relates to the rotational position of a knob 130. The knob 130 may include a collar 135 that fits around the annular shoulder portion 115 of the body 110 adjacent to the sling loop 160. Alternately, the knob may seat against the annular shoulder portion 115 substantially without overlap. Further, at least a portion of the knob may be textured to improve grip to rotate the knob 130. The collar may include a pair of recesses 137 that alternately allow the collar 135 to engage and disengage the sling loop 160 when the sling swivel 100 is unlocked and locked respectively. For example, as illustrated by FIG. 1, the knob 130 is rotated such that the recesses 137 do not align with the sling loop 160. FIG. 2 illustrates the knob 130 rotationally offset approximately 90 degrees from that of FIG. 1 such that the recesses 137 align with the sling loop 160. As the knob 130 is rotated, and the sling swivel 100 adjusts from the locked configuration of FIG. 2 to the unlocked configuration of FIG. 1, the edge of the collar 135 contacts the sling loop 160 and pushes the knob 130 away from the annular shoulder portion 115 of the body 110. In turn, the knob 130 translates a plunger 300 coupled thereto within the cavity or bore in the body 110 to control the extension or retraction of the bearings 150.

Described alternatively, the knob 130 may be axially rotatable relative to the body 110 to drive the plunger 300 or actuator between a first and second position to extend and retract the bearings 150, locking and unlocking the sling swivel 100 respectively. The knob 130 may include a crown cam surface that rides against a projection extending from the body 110 to drive the knob 110 and plunger 300 or actuator. In an embodiment, the projection against which the crown cam surface rides is the sling loop 160 and the crown cam surface may be the edge of collar 135. In a further embodiment, the knob 130 may include a cam surface in the absence of the collar 135. The cam surface of the knob 130 may interact with or ride along a complementary cam surface included on body 110.

Figure 3:
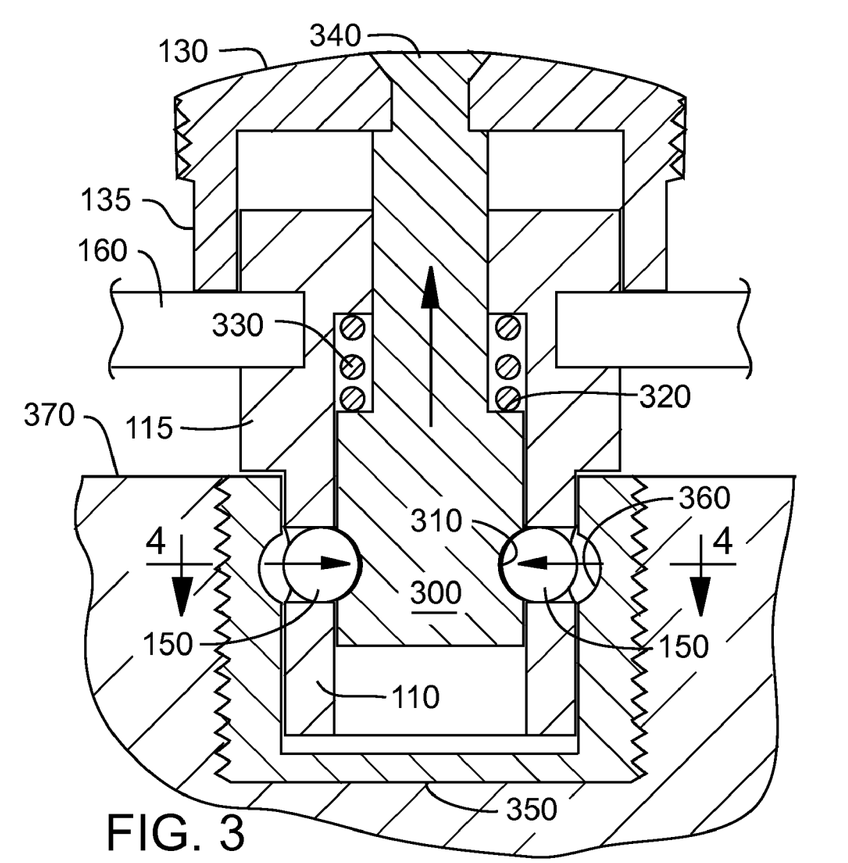
FIG. 3 is an enlarged cross sectional elevation view of the sling swivel of FIG. 1 in the unlocked configuration shown inserted into a swivel base.
Figure 4:
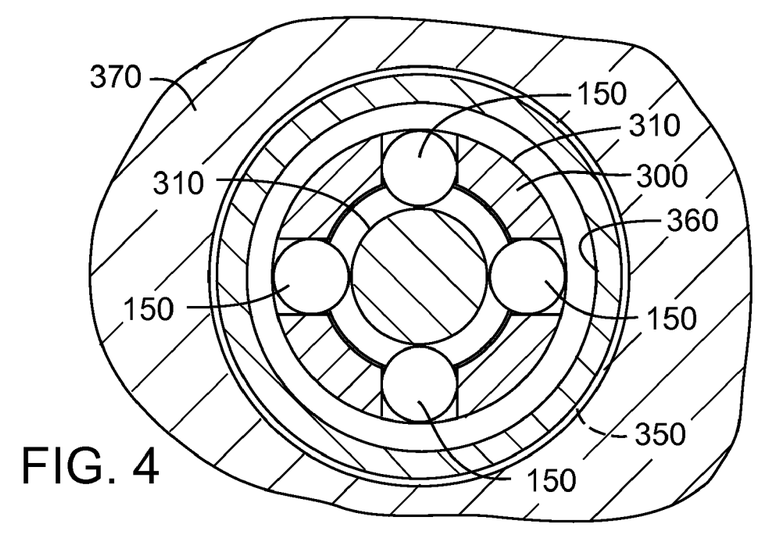
FIG. 4 is a cross section of the sling swivel of FIG. 3 taken along line 4-4 of FIG. 3, showing detail of a lock mechanism of the sling swivel and swivel base.

FIGS. 3 and 4 illustrate cross sections of the sling swivel in an unlocked configuration (e.g., cross sections of FIG. 1) inserted into the sling swivel base 350 or sling swivel socket. The insertion depth of the body 110 is specified by the abutment of the annular shoulder portion 115 of body 110 with the sling swivel base 350 or sling swivel socket. Sling swivel base 350 is further inserted in or otherwise attached to firearm 370 (e.g., at the forearm and/or stock of the firearm 370). The ends of the sling loop 160 extend into or through the annular shoulder portion 115 and in an embodiment also into body 110 substantially far enough to movably secure the sling loop 160 to the annular shoulder portion 115 of body 110 while not intruding into the axially disposed cavity or bore therein to substantially avoid interfering with the operation of the plunger 300 within the body 110 cavity or bore. In an embodiment, the sling loop 160 may not be substantially movable, for example if it had a non-circular cross section.

FIG. 3 illustrates that as the knob 130 is rotated to unlock the sling swivel 100, the collar 135 edge (at least a portion of which may be a crown cam surface) contacts the sling loop 160 and pushes the knob 130 away from the annular shoulder portion 115 of the body 110. The plunger 300 may coupled to the knob 130 by peening the end of the plunger 300 that extends through a hole formed in the knob 130. In such a manner, the plunger 300 is axially coupled to the knob 130 while remaining substantially rotationally uncoupled. When the knob 130 is pushed away from the annular shoulder portion 115, it translates the plunger 300 along the longitudinal axis of the cavity or bore in body 110. The plunger 300 of an embodiment includes an annular groove 310. When the knob 130 is rotated such that the sling swivel 100 is in the unlocked configuration, the plunger 300 position aligns the annular groove 310 with the bearings 150. The bearings 150 may then retract into the annular grove 310 such that they do not extend beyond the outer surface of body 110. More specifically, the annular groove 310 provides the bearings 150 space to retract when the body 110 is inserted into or removed from the sling swivel base 350. FIG. 4 is a cross section of the unlocked sling swivel 100 of FIGS. 1 and 3 as taken along the line 4-4 of FIG. 3. The bearings 150 may retract into the annular groove 310 in plunger 300 so that they do not extend beyond the surface of body 110. The sling swivel 100 in this unlocked configuration be inserted into and removed from the sling swivel base 350 or sling swivel socket.

Figure 5:
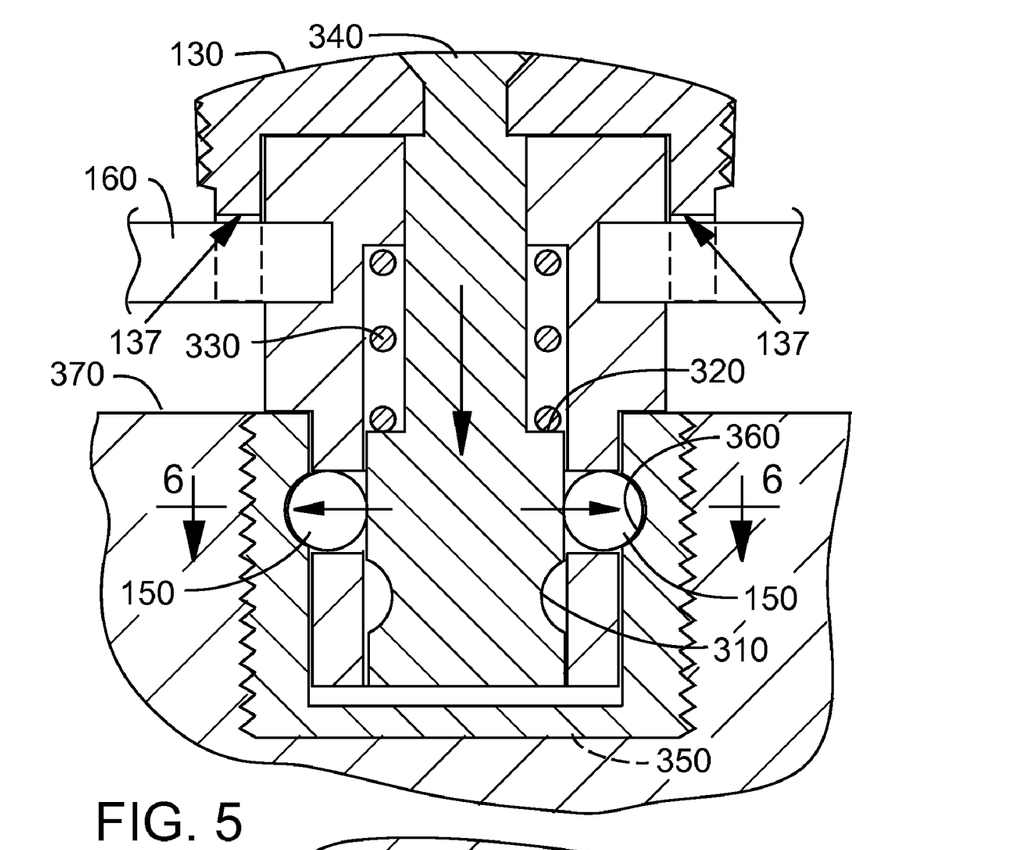
FIG. 5 is an enlarged cross sectional elevation view of the sling swivel of FIG. 2 in the locked configuration, shown mated with a swivel base.
Figure 6:
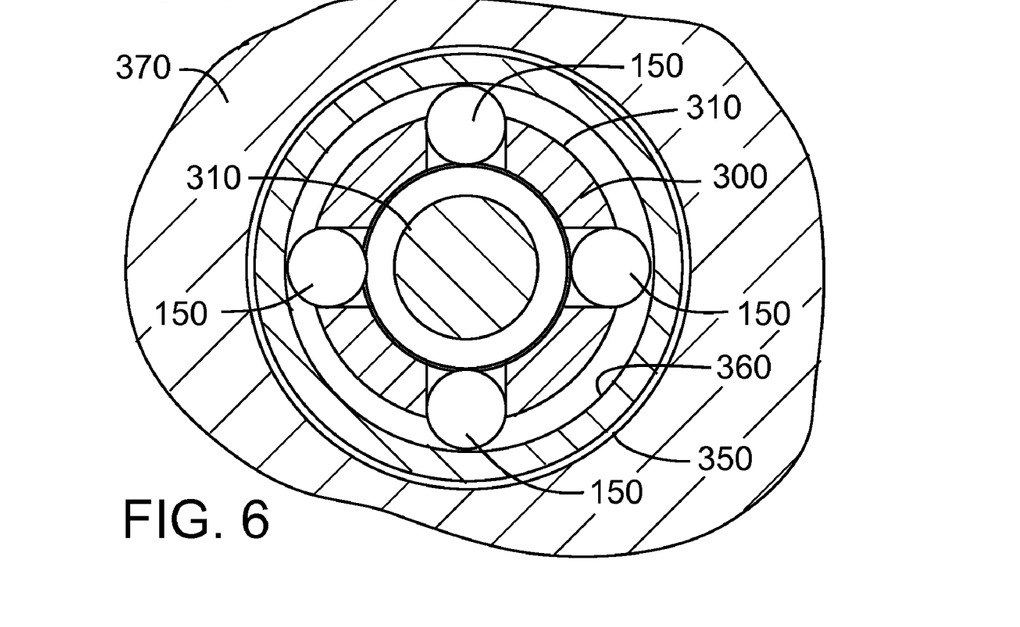
FIG. 6 is a cross section of the sling swivel of FIG. 5 taken along line 6-6 of FIG. 5, showing detail of the lock mechanism of the sling swivel and swivel base.
Figures 7, 8, 9:
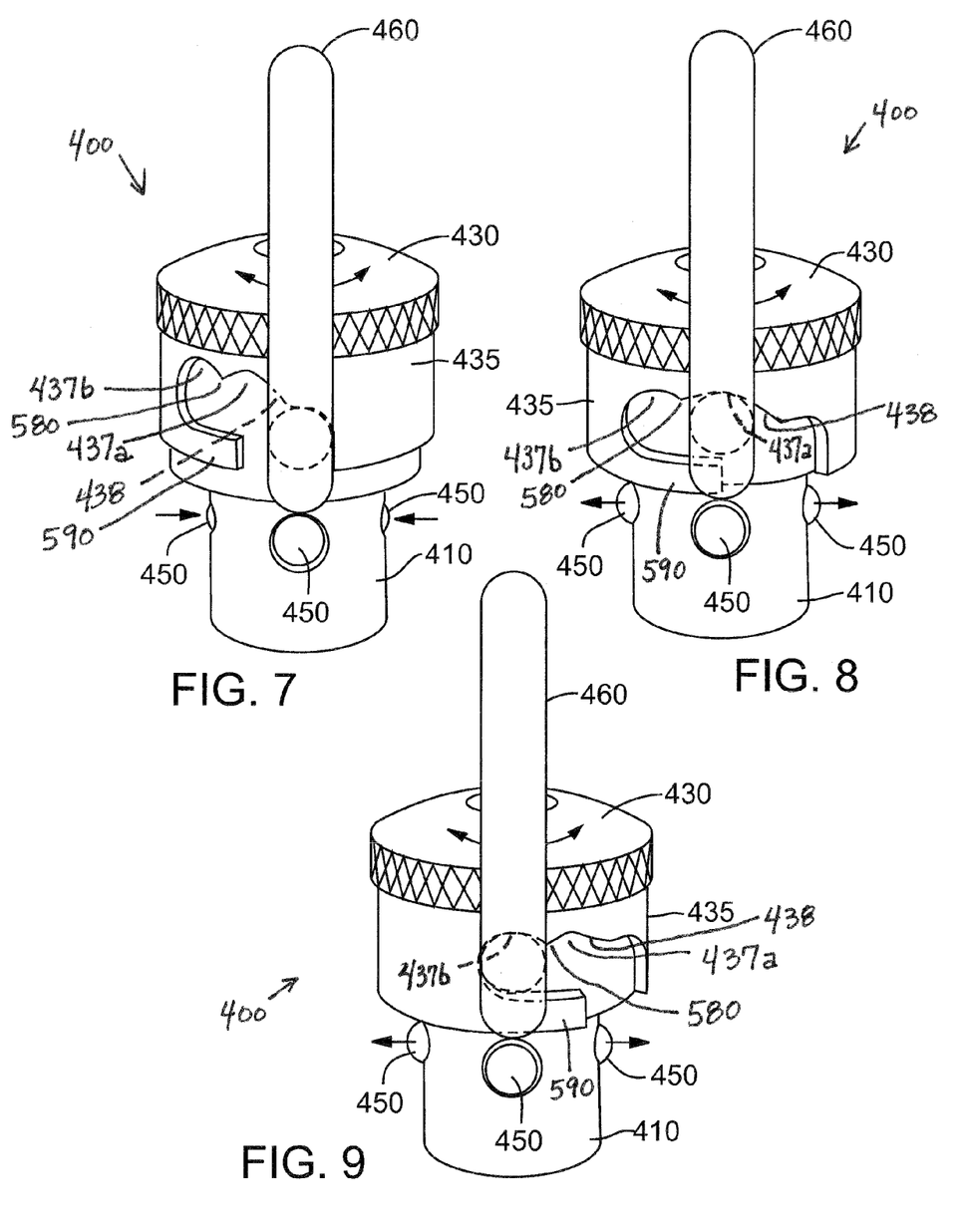
FIG. 7 is a pictorial side view of a sling swivel according to another embodiment, shown in an unlocked configuration.
FIG. 8 is a pictorial side view of the sling swivel of FIG. 7 shown with a locking cap of the sling swivel in an intermediate locked configuration.
FIG. 9 is a pictorial side view of the sling swivel of FIG. 7 shown with a locking cap of the sling swivel twisted to a fully-locked and secure configuration.
Figure 10:
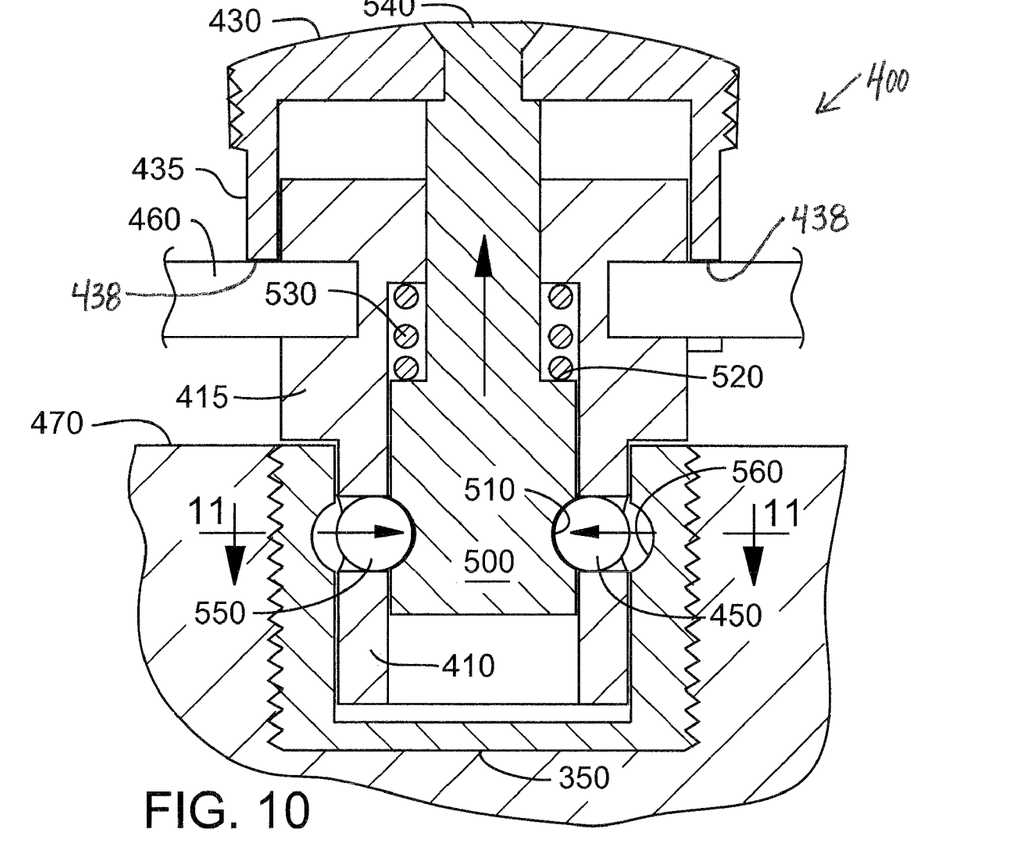
FIG. 10 is an enlarged cross sectional elevation view of the sling swivel of FIG. 7 in the unlocked configuration shown inserted into a swivel base.
Figure 11:
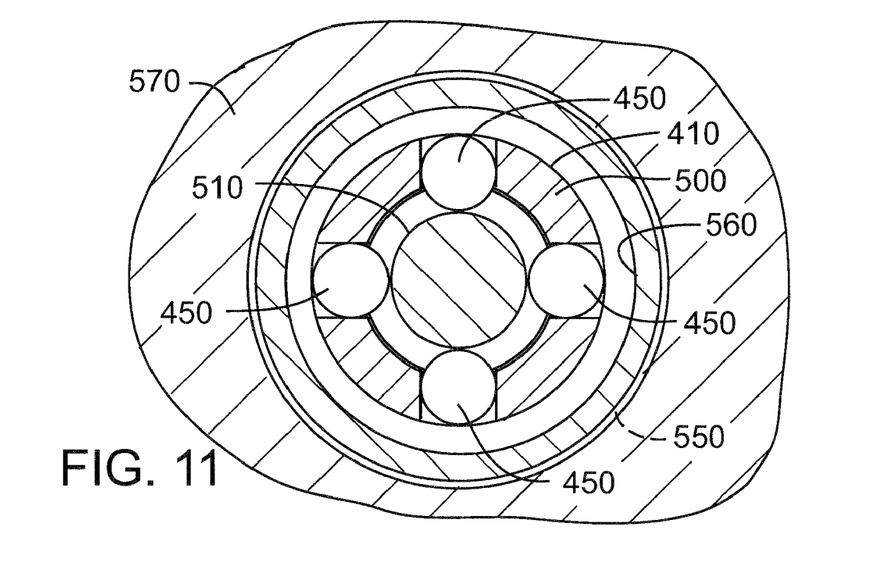
FIG. 11 is a cross section of the sling swivel of FIG. 1 taken along line 11-11 of FIG. 10, showing detail of a lock mechanism of the sling swivel and swivel base.
Figure 12:
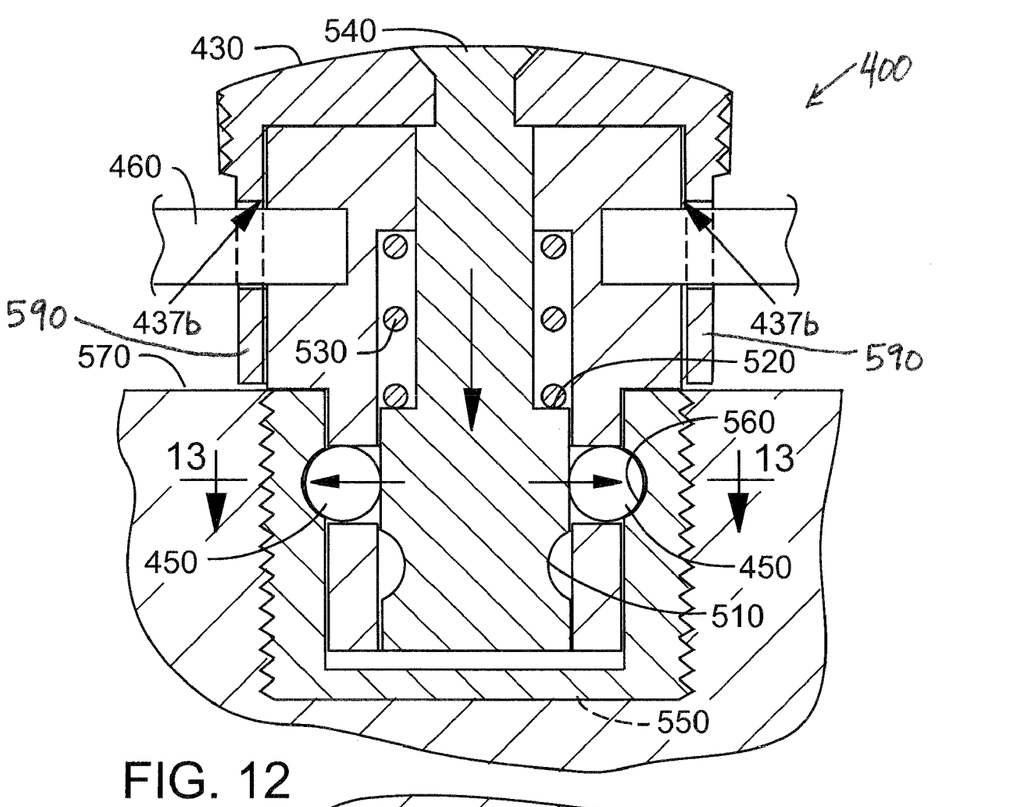
FIG. 12 is an enlarged cross sectional elevation view of the sling swivel of FIG. 9 in the locked configuration, shown mated with a swivel base.
Figure 13:
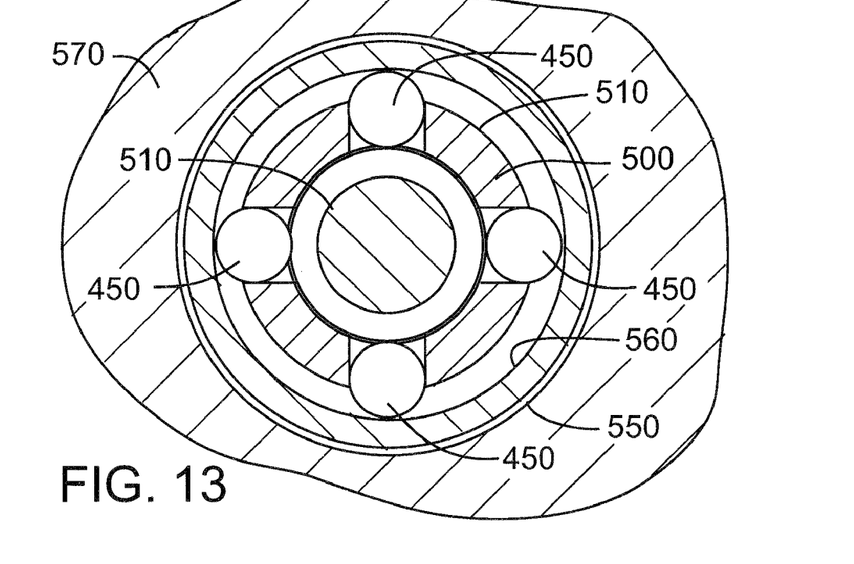
FIG. 13 is a cross section of the sling swivel of FIG. 1 taken along line 13-13 of FIG. 12, showing detail of the lock mechanism of the sling swivel and the swivel base.

FIG. 5 illustrates that when the knob 130 is rotated approximately 90 degrees such that the recesses 137 align with the sling loop 160, the collar 135 edge no longer pushes against the sling loop 160 (e.g., at least a portion of the collar 135 edge may not be a crown cam surface) and the knob 130 no longer translates the plunger 300 coupled thereto. The annular groove 310 of plunger 300 therefore no longer aligns with the bearings 150. By contact with the outer surface of the plunger 300, the bearings 150 are extended radially outwardly beyond the surface of the body 110 to lock the sling swivel 100 to the sling swivel base 350 or sling swivel socket into which the sling swivel 100 has been inserted. FIG. 6 is a cross section of the locked sling swivel 100 of FIGS. 2 and 5 taken along the line 6-6 of FIG. 5. As noted, the bearings 150 may extend into the annular groove 360 in sling swivel base 350 to lock the sling swivel 100 to the sling swivel base 350.

In general, the sling swivel base 350 may be a socket whose bore detachably engages the body 110 of sling swivel 100. The sling swivel base 350 of an embodiment is attached to or included within firearm 370. In an embodiment, the outer surface of the sling swivel base 350 may be threaded to screw into, for example, the forearm and/or stock of firearm 370. The sling swivel base 350 of an embodiment includes an annular groove 360 formed within the bore and adjacent to the open end of the sling swivel base 350. In an embodiment, the annular groove 360 may have a semi-spherical cross sectional contour. In another embodiment, the annular groove 360 may have alternate contours complementary to the outside contour of the body 110 should the bearings 150 be substituted with other substantially equivalent locking members. When the annular shoulder portion 115 of the body 110 abuts the sling swivel base 350, the bearings 150 substantially align with the annular grove 360 in the sling swivel base. Accordingly, the bearings 150 may extended laterally beyond the outside surface of the body 110 and into the annular grove 360 of the sling swivel base 350 to lock the sling swivel 100 in place.

After the sling swivel 100 has been inserted into the sling swivel base 350 and locked by rotating the knob 130 so that the pair of recesses 137 in the collar 135 align with the sling loop 160 and the plunger 300 extends the bearings 150 into the annular groove 360, the sling swivel 100 may nevertheless rotate within the sling swivel base 350. For example, while the bearings 150 extended into the annular groove 360 may substantially prevent the sling swivel 100 from axial movement within the bore of the sling swivel base 350, the annular groove 360 may serve as a race for the bearings 150 to allow the sling swivel 100 to rotate relative to the sling swivel base 350.

In an embodiment, the plunger 300 includes an annular shoulder 320 that in conjunction with the cavity or bore shape of body 110, defines an annular gap that include a spring 330. In an embodiment, the spring 330 is compressed when the sling swivel 100 is locked and compressed further when the sling swivel 100 is unlocked. The compression of the spring 330 imparts force on the plunger 300 and the knob 130 such that the knob 130 maintains its rotational position, and/or the plunger is biased toward its position for which the sling swivel 100 is locked unless a sufficient rotational force is applied to the knob 130 to further compress the spring 330 to unlock the sling swivel 100. In this manner, the sling swivel 100 may be securely detachably locked into the sling swivel base 350 or sling swivel socket and not be substantially prone to inadvertent or accidental detachment. The force applied by the spring 330 as well as the profile of the pair of recesses 137 in the collar 135 of the knob 130 (e.g., the profile of the crown cam surface) may be altered to control the amount of rotational force required by the knob to unlock the sling swivel 100.

Further, when the sling swivel 100 is locked, the pair of recesses 137 in the collar 135 of the knob 130 are deep enough such that the recesses 137 do not contact the sling loop 160. Alternatively, at least a portion of the knob 130 or collar 135 may not be a crown cam surface as it does not contact a projection extending from the body 110, for example the sling loop 160. The sling loop 160 may therefore rotate within the pair of transverse openings in the annular shoulder 115 of body 110. In combination with the rotational movement of the sling swivel 100 relative to the sling swivel base 350 or sling swivel socket, the sling swivel 100 may adjust and align to the direction in which the sling strap is pulled.

Based on the features of the sling swivel included above, a shooter may detachably engage a sling to their firearm (the firearm normally including a pair of sling swivel bases 350) by first rotating the knob 130 of each sling swivel 100 attached to the sling to translate the plunger 300 to the unlocked position thereby unlocking the sling swivel 100. Thereafter, the shooter may insert the body 110 of each sling swivel 100 into its corresponding sling swivel base 350, rotate the knob 130 to translate the plunger 300, and lock the sling swivel 100 to the sling swivel base 350. To remove the sling swivel 100 from the sling swivel base 350, the shooter need only rotate the knob 130 to again translate the plunger 300 to the unlocked position to unlock the sling swivel 100. In an embodiment, the shooter may turn the knob 130 approximately 90 degrees in either direction (e.g., clockwise or counter clockwise) to lock and unlock the sling swivel 100.

Though an embodiment includes the axial movement of the plunger 300 or actuator within the axially-disposed cavity of the body 110, in a further embodiment, the plunger 300 or actuator may be rotationally coupled to the knob 130 in addition to or in lieu of being axially coupled. Accordingly, the plunger 300 or actuator may have an axial groove or grooves to interact with one or more detent balls or bearings 150 to extend and retract the detent balls or bearings 150. Further, the plunger 300 or actuator may include one or more depression to interact with one or more detent balls or bearings 150.

FIGS. 7-13 illustrate another embodiment of a sling swivel 400 including a twist-lock connector. In FIGS. 7-13, 4xx-series reference numerals correspond to 1xx-series reference numerals of FIGS. 1-6 and identify similar parts. For example, reference 430 of FIGS. 7-13 corresponds to knob 130 of FIGS. 1-6. Similarly, 5xx-series reference numerals in FIGS. 7-13 correspond to 3xx-series reference numerals of FIGS. 1-6 and identify similar elements. The sling swivel 400 of FIGS. 7-13 represents an improvement over the sling swivel 100 of FIGS. 1-6, in that the knob 430 and collar 435 of sling swivel 400 are configured to prevent sling swivel 400 from being inadvertently unlocked through axially movement of knob 430, when in the fully locked position of FIG. 9.

With reference to FIGS. 7-13, collar 435 of knob 430 includes a first recess 437a and a second recess 437b, the first recess 437a being interposed between the second recess 437b and cam surface 438 of collar 435. To release sling swivel 400, knob 430 is manually twisted to the unlocked position shown in FIG. 7. When the user lets go of knob 430, spring force of spring 520 (FIG. 10) pulls collar and cam surface 438 against loop 460 to thereby drive knob 430 to the intermediate, locked position shown in FIG. 8. The knob 430 can then be manually twisted to a fully locked and secure position shown in FIGS. 9, 12, and 13. In the fully locked position, a detent ridge 580 of collar 435, separating first recess 437a from second recess 437b, acts in cooperation with the tension of spring 520 (FIG. 10) to retain knob 430 in the fully locked configuration shown in FIG. 9. In the fully locked position, a retaining arm 590 of collar 435 opposite second recess 437b prevents a user from forcefully pulling knob 430 outward from body 410 to unlock sling swivel 400. Thus, retaining arm 590 prevents inadvertent unlocking and disengagement of sling swivel 410 from swivel base 550. A second set of recesses 437a, 437b, detent ridge 580, and retaining arm 590 are present on collar 435 opposite the first set shown in FIGS. 7-9 and adjacent the second point where loop 460 connects to body 410. The particular shape and configuration of first and second recesses 437a, 437b, detent ridge 580 and retaining arm 590 is a matter of engineering choice. For example, in an alternative embodiment (not shown), first recess 437a and detent ridge 580 may be omitted. In another embodiment (not shown), recesses 437a and 437b may be replaced by a continually sloping cam surface 438 extending above retaining arm 590 adjacent a sloped slot. Many other configurations may be possible within the spirit of the invention.

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Furthermore, the described features, structures, characteristics, and methods may be combined in any suitable manner in one or more embodiments. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

While certain features of an embodiment yield certain advantages, the arrangement, dimensions, combination of the various features, and the resulting overall appearance of sling swivels 100 and 400 may be tailored to satisfy aesthetic and ornamental needs. Further, It will be obvious to those having skill in the art that many changes may be made to the details of the above-described embodiments without departing from the underlying principles of the invention. The scope of the present invention should, therefore, be determined only by the following claims.

The invention claimed is:

1. A sling swivel comprising:
   a cylindrical body, the cylindrical body defining an axially disposed cavity therein;
   a plunger slidably supported within the cavity for movement relative thereto;
   a knob coupled to the plunger, the knob including a cam surface that rides against a projection extending from the cylindrical body, the knob to rotate between a first rotational position and a second rotational position to translate the plunger along a longitudinal axis of the cavity between a first position and a second position; and
   a sling loop attached to the cylindrical body adjacent to the knob.

2. The sling swivel of claim 1, the first position and the second position of the plunger comprising a locked position and an unlocked position respectively.

3. The sling swivel of claim 1, the cam surface comprising a collar attached to the knob and substantially overlapping a portion of the cylindrical body.

4. The sling swivel of claim 3, the projection extending from the cylindrical body comprising the sling loop.

5. The sling swivel of claim 4, the collar comprising a pair of recesses to substantially prevent the collar from contacting the sling loop when the knob is in the first rotational position.

6. The sling swivel of claim 1, the cavity comprising a spring operably interposed between the plunger and the cylindrical body to bias the plunger toward the first position.

7. The sling swivel of claim 1, the plunger comprising an annular channel formed therein.

8. The sling swivel of claim 7, the cylindrical body comprising a plurality of passages formed therein along a circumference of the cylindrical body and a plurality of bearings interposed between the passages and the plunger, the bearings to
   extend radially past an outer surface of the cylindrical body when the plunger is in the first position, and
   retract radially within the outer surface of the cylindrical body when the plunger is in the second position, the bearings to retract into the annular channel formed in the plunger.

9. The sling swivel of claim 8 further comprising a sling swivel socket, the sling swivel socket including an annular channel formed therein, the sling swivel socket to permit insertion and removal of the sling swivel when the plunger is in the second position and to detachably engage the sling swivel when the sling swivel is inserted into the sling swivel socket and the plunger is in the first position.

10. The sling swivel of claim 9 wherein the bearings extend into the annular channel of the sling swivel socket when the plunger is in the first position to lock the sling swivel to the sling swivel socket.

11. The sling swivel of claim 10, the annular channel of the sling swivel socket comprising a race for the bearings, the sling swivel capable of rotating within the sling swivel socket when locked to the sling swivel socket.

12. A sling swivel including a twist release coupling mechanism comprising:
   a body defining an axially disposed bore;
   a plunger operable within the bore; and
   a knob coupled to the plunger, the knob to rotate between a first rotational position and a second rotational position with respect to the body to translate the plunger along a longitudinal axis of the bore between a locked position and an unlocked position respectively to permit detachable engagement and disengagement of the sling swivel with a sling swivel base.

13. The sling swivel of claim 12, further comprising a sling loop attached to the body adjacent the knob, the knob comprising a collar substantially overlapping a portion of the body, the knob including a pair of recesses on substantially opposite sides of the collar.

14. The sling swivel of claim 13 wherein the pair of recesses is located proximate the sling loop when the knob is in the first rotational position, the collar to substantially not contact the sling loop when the knob is in the first rotational position.

15. The sling swivel of claim 13 wherein the pair of recesses is rotationally offset from the sling loop when the knob is in the second rotational position, the collar to contact the sling loop and to push the knob away from the body to translate the plunger coupled to the knob to the unlocked position.

16. The sling swivel of claim 12, the bore comprising a spring to substantially maintain the plunger in the locked position when the knob is in the first rotational position.

17. The sling swivel of claim 12, the plunger comprising an annular channel formed therein.

18. The sling swivel of claim 17, the body comprising a plurality of holes formed therein along a circumference of the body and a plurality of bearings interposed between the holes and the plunger, the bearings to
   extend radially past an outer surface of the body when the plunger is in the locked position, and
   retract radially within the outer surface of the body when the plunger is in the unlocked position, the bearings to retract into the annular channel formed in the plunger.

19. The sling swivel of claim 18 further comprising a sling swivel base, the sling swivel base defining a substantially hollow cylinder with an annular channel formed therein, the sling swivel base to permit insertion and removal of the sling swivel when the plunger is in the unlocked position and to detachably engage the sling swivel when the sling swivel is inserted into the sling swivel base and in the locked position.

20. The sling swivel of claim 19 wherein the bearings extend into the annular channel of the sling swivel base when the plunger is in the locked position to lock the sling swivel to the sling swivel base, and wherein the sling swivel is capable of rotating within the sling swivel base when locked to the sling swivel base.

21. A sling swivel releasably couplable to a swivel-receiving socket having a inner circumferential groove, comprising:
- a cylindrical plug body defining an axially-disposed cavity and a ball cage including at least one radially-extending passage for a detent ball, the plug body having an outer surface;
- a sling loop extending from the plug body and sized to receive a sling strap;
- an actuator slidably supported within the cavity and including at least one radially inwardly extending depression formed therein, the actuator movable between a first position holding the detent ball radially outward so that at least a portion of the detent ball projects beyond the outer surface of the plug body for engagement with the circumferential groove of the socket and a second position in which the depression in the actuator is aligned with the passage of the ball cage to thereby release the detent ball;
- a spring operably interposed between the actuator and the plug body for biasing the actuator toward the first position; and
- a knob coupled to the actuator and axially rotatable relative to the plug body to drive the actuator toward the second position and thereby release the detent ball, the knob including a crown cam surface that rides against a projection extending from the plug body to drive the knob in a first axial direction relative to the plug body in response to rotation of the knob, the knob being biased in a second axial direction opposite the first axial direction to releasably retain the knob and the actuator in the first position.

* * * * *